United States Patent
Okamoto

(10) Patent No.: US 7,628,127 B2
(45) Date of Patent: Dec. 8, 2009

(54) APPARATUS AND METHOD FOR CONTROLLING VARIABLE VALVE ACTUATION MECHANISM

(75) Inventor: Naoki Okamoto, Isesaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/349,912

(22) Filed: Feb. 9, 2006

(65) Prior Publication Data
US 2006/0174849 A1    Aug. 10, 2006

(30) Foreign Application Priority Data
Feb. 10, 2005   (JP)   ............... 2005-034780

(51) Int. Cl.
*F01L 1/34*   (2006.01)
(52) U.S. Cl. ............... 123/90.16; 123/90.15; 123/90.17
(58) Field of Classification Search ............... 123/90.16, 123/90.15, 90.17, 90.31
See application file for complete search history.

(56) References Cited

U.S. PATENT DOCUMENTS

| | | | |
|---|---|---|---|
| 6,302,085 B1 * | 10/2001 | Sekine et al. | 123/406.62 |
| 6,397,803 B1 | 6/2002 | Fujiwara et al. | |
| 6,401,675 B1 * | 6/2002 | Nakamura et al. | 123/90.15 |
| 6,502,535 B2 * | 1/2003 | Nakamura | 123/90.15 |
| 7,107,951 B2 * | 9/2006 | Urushihata et al. | 123/90.17 |
| 7,191,589 B2 * | 3/2007 | Yasui et al. | 60/284 |
| 2005/0000480 A1 | 1/2005 | Yasui et al. | |

FOREIGN PATENT DOCUMENTS

| | | |
|---|---|---|
| EP | 1 273 770 A2 | 1/2003 |
| EP | 1 464 860 A1 | 10/2004 |
| EP | 1 493 908 A2 | 1/2005 |
| JP | 9-209724 A | 8/1997 |
| JP | 2003-336530 A | 11/2003 |
| JP | 2004-92420 A | 3/2004 |

OTHER PUBLICATIONS

Office Action for related Chinese Application No. 200610007440.5, dated Aug. 8, 2008.

* cited by examiner

*Primary Examiner*—Zelalem Eshete
(74) *Attorney, Agent, or Firm*—Foley & Lardner LLP

(57) ABSTRACT

A pulse signal output from a crank angle sensor is counted from start of an engine starting operation, and whether or not an engine rotation is started is determined at the time when the count result reaches a predetermined number. When the determination of the rotation start is made, a variable valve actuation mechanism is permitted to be driven.

12 Claims, 7 Drawing Sheets

APPARATUS AND METHOD FOR CONTROLLING VARIABLE VALVE ACTUATION MECHANISM

BACKGROUND OF THE INVENTION

1. Field of the Invention

The present invention relates to an apparatus and method for controlling a variable valve actuation mechanism which varies operating characteristics of an engine valve.

2. Description of the Related Art

Japanese Unexamined Patent Publication No. 2004-092420 discloses a starting control apparatus in which, a starting property of an internal combustion engine is improved by increasing a valve opening amount of an intake valve when an ignition switch or a starting switch is turned on, in a case where the internal combustion engine is equipped with a variable valve actuation mechanism which varies the valve opening amount of the intake valve.

The same publication also discloses that the valve opening amount of the intake valve is increased when an engine speed exceeds a predetermined speed after cranking is started.

Nevertheless, even if an actuator of the variable valve actuation mechanism is controlled in order to increase the valve opening amount of the intake valve at the time when the ignition switch or the starting switch is turned on, friction is large against working of the variable valve actuation mechanism, and actually the variable valve actuation mechanism could not work because engine rotation is not started yet.

Accordingly in the case where the variable valve actuation mechanism is driven, for example, by a motor, it is necessary that the variable valve actuation mechanism includes a motor and a drive circuit which can withstand the large amount of current because a large amount of current is passed through the motor at the start of the engine starting.

In the case where the valve opening amount of the intake valve is increased after the engine speed exceeds the predetermined speed, sometimes the increase in valve opening amount of the intake valve is delayed for the start of the engine starting to worsen the engine starting property.

SUMMARY OF THE INVENTION

In view of the foregoing, an object of the invention is to provide a control technology which enables it to drive a variable valve actuation mechanism in good response to the beginning of the engine starting while preventing the passage of the large amount of current through the motor of the variable valve actuation mechanism.

In order to achieve the above object, in the present invention, drive of a variable valve actuation mechanism is started after the start of engine rotation is detected.

The other objects and features of this invention will become understood from the ensuing description with reference to the accompanying drawing.

DESCRIPTION OF THE PREFERRED EMBODIMENT

Figure 1:
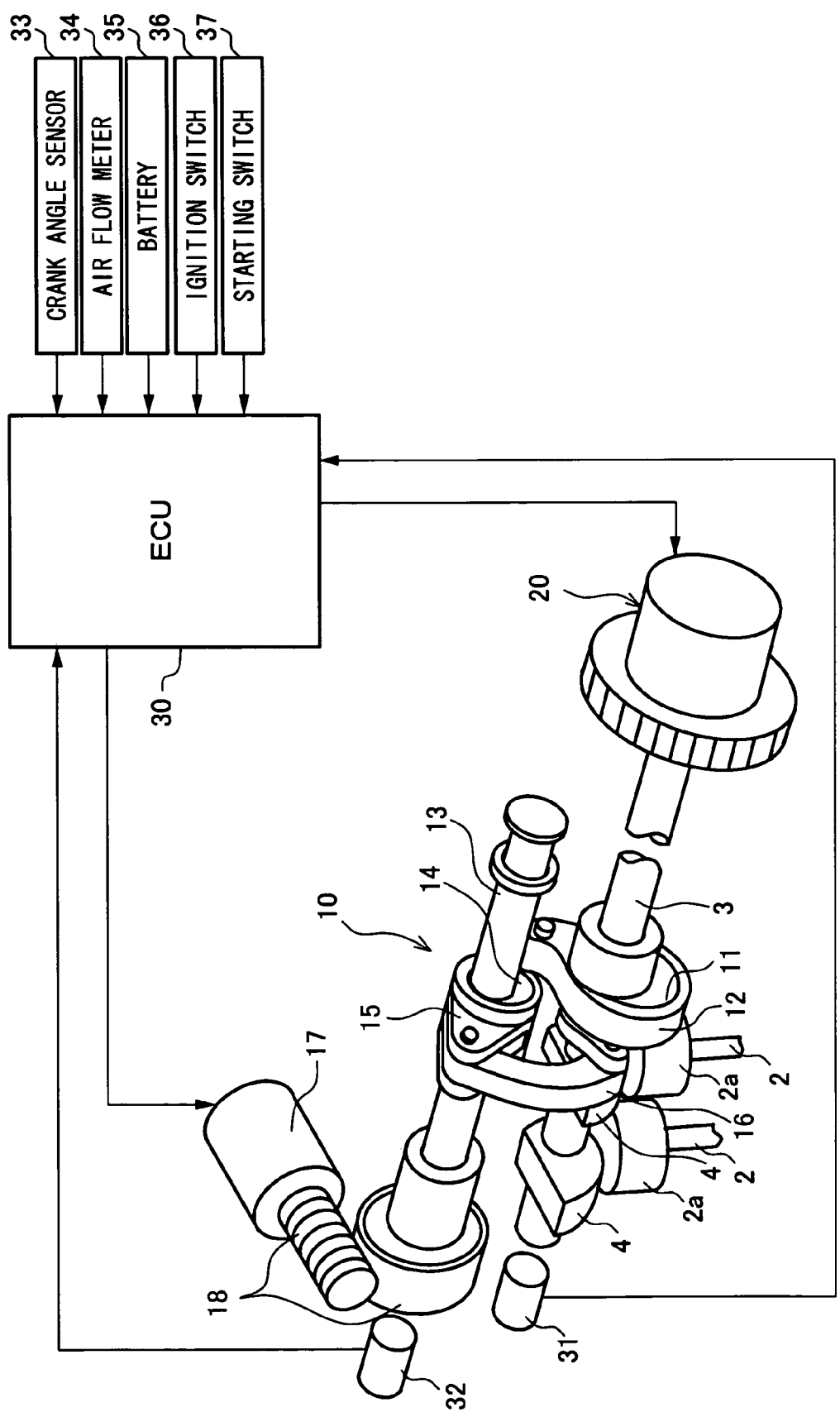
FIG. 1 is a perspective view showing a variable valve actuation mechanism according to an embodiment.

FIG. 1 shows a variable valve actuation mechanism and a control apparatus thereof according to an embodiment.

In an engine (gasoline internal combustion engine) to which the variable valve actuation mechanism of the embodiment is applied, a pair of intake valves 2 is provided in each cylinder.

In an upper portion of intake valve 2, intake drive shaft 3 is rotatably supported along a direction of a cylinder row. Intake drive shaft 3 is rotated by a crankshaft (not shown).

Intake drive shaft 3 is fitted in rocking cam 4 while rocking cam 4 can be relatively rotated. Rocking cam 4 in its rotation is kept in contact with valve lifter 2a of intake valve 2 to open and close intake valve 2.

Variable operating angle control mechanism 10 (variable valve actuation mechanism) is provided between intake drive shaft 3 and each of rocking cams 4 to continuously change an operating angle and a valve lift amount of each of intake valves 2. At this stage, it should be appreciated that for brevity sake, although only one variable operating angle control mechanism 10 for one of the pair of intake valves 2 is illustrated, another variable operating mechanism 10 is provided for the other of the pair of intake valves 2.

Variable phase-control mechanism 20 (variable valve actuation mechanism) is arranged at one end portion of intake drive shaft 3. Variable phase-control mechanism 20 continuously changes a central phase of the operating angle of intake valve 2 by changing a rotational phase of intake drive shaft 3 relative to the crankshaft.

Figure 2:
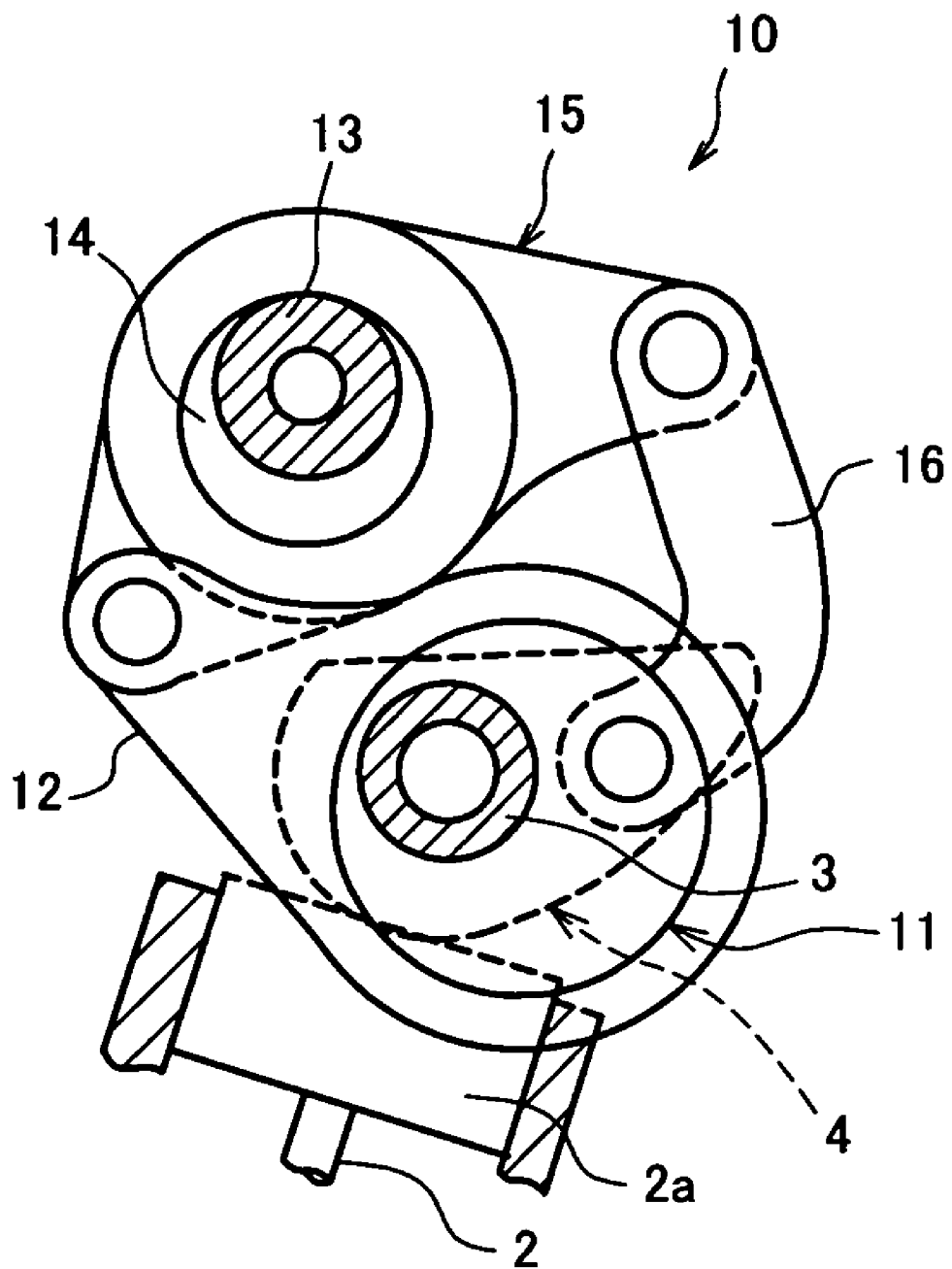
FIG. 2 is a sectional view showing a variable operating angle control mechanism of FIG. 1.

As shown in FIGS. 1 and 2, variable operating angle control mechanism 10 includes circular drive cam 11, ring-shaped link 12, control shaft 13, circular control cam 14, rocker arm 15, and rod-shaped link 16. Drive cam 11 is fixedly provided while being eccentric with respect to intake drive shaft 3. Drive cam 11 is fitted in ring-shaped link 12 while ring link 12 can relatively be rotated. Control shaft 13 extends in the direction of the cylinder row substantially in parallel with intake drive shaft 3. Control cam 14 is fixedly provided on control shaft 13 while being eccentric with respect to control shaft 13. Control cam 14 is fitted in rocker arm 15 while rocker arm 15 can be relatively rotated, and one end of rocker arm 15 is coupled to an end of ring-shaped link 12. Rod-shaped link 16 is coupled to the other end of rocker arm 15 and to rocking cam 4.

Control shaft 13 is rotated within a predetermined control range through gear train 18 by motor 17.

In the above configuration, when intake drive shaft 3 is rotated in conjunction with the crankshaft, rocker arm 15 is rocked about the axis of control cam 14 while ring-shaped link 12 is substantially translated through drive cam 11. This enables rocking cam 4 to be rocked through rod-shape link 16 so as to open and close intake valve 2.

The axis of control cam 14 which forms a rocking center of rocker arm 15 is changed in its position so as to eventually change an attitude of rocking cam 4 by adjustably changing an angle of rotation of control shaft 13 with motor 17.

Therefore, the operating angle and the valve lift amount of intake valve 2 are continuously changed while the central phase of the operating angle is kept substantially constant in intake valve 2.

Figure 3:
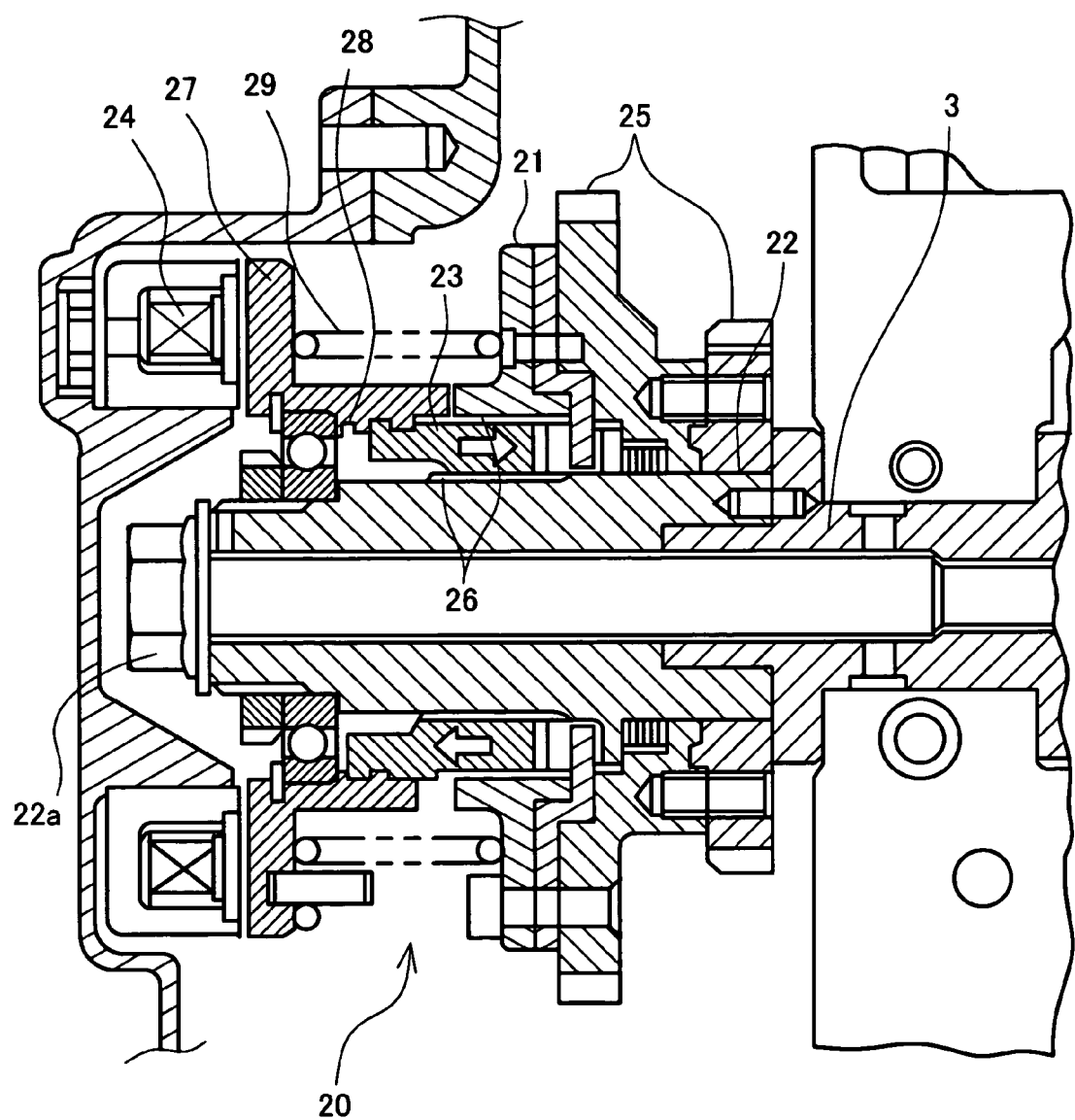
FIG. 3 is a sectional view showing a variable phase control mechanism of FIG. 1.

FIG. 3 shows the afore-mentioned variable phase control mechanism 20.

Variable phase control mechanism 20 includes first rotation body 21, second rotation body 22, and cylindrical intermediate gear 23. First rotation body 21 is fixed to sprocket 25 which is rotated in synchronization with the crankshaft, and first rotation body 21 is integrally rotated along with sprocket 25. Second rotation body 22 is fixed to one end of intake drive shaft 3 by bolt 22a, and second rotation body 22 is integrally rotated along with intake drive shaft 3. Intermediate gear 23 engages an inner peripheral surface of first rotation body 21 and an outer peripheral surface of second rotation body 22 by helical spline 26.

Drum 27 is coupled to intermediate gear 23 through triple threaded screw 28, and torsion spring 29 is inserted between drum 27 and intermediate gear 23, via interposition of first rotation body 21.

Intermediate gear 23 is biased in a direction toward a retard position (leftward in FIG. 3) by torsion spring 29. When a voltage is applied to electromagnetic retarder 24 to generate a magnetic force, intermediate gear 23 is moved toward the direction of an advance position (rightward in FIG. 3) through drum 27 and triple threaded screw 28.

A relative phase between rotation bodies 21 and 22 is changed to change the phase of intake drive shaft 3 with respect to the crankshaft according to a position in an axial direction of intermediate gear 23.

Motor 17 and electromagnetic retarder 24 are driven and controlled according to an engine running state by a control signal from engine control unit 30.

Detection signals are input from various sensors to engine control unit 30 in which a microcomputer is incorporated.

Examples of various sensors provided in the engine include drive shaft sensor 31, angle sensor 32, crank angle sensor 33, and air flow meter 34. Drive shaft sensor 31 outputs a pulse signal at a predetermined rotation angle position of intake drive shaft 3. Angle sensor 32 continuously detects the angle of rotation of control shaft 13. Crank angle sensor 33 outputs the pulse signal at every time when the crankshaft is rotated by a constant angle (for example, 10 degrees). Air flow meter 34 detects intake air flow rate of the engine.

The voltage of battery 35 which is of electric power is supplied to engine control unit 30. The voltage of battery 35 is also the electric power to a starter motor (not shown). ON and OFF signals of ignition switch 36 and starting switch 37 are input to engine control unit 30.

Engine control unit 30 controls a fuel injection amount, fuel injection timing, and ignition timing based on the detection signals from the various sensors, and the engine control unit 30 controls the operating angle and the central phase of intake valve 2.

In the present embodiment, for a target value of the operating characteristics of intake valve 2 at the time of the engine starting, unlike a default state at the time of the engine stop, it is necessary that the variable valve actuation mechanism be driven and controlled toward the target for the starting from a default position.

Figure 4:
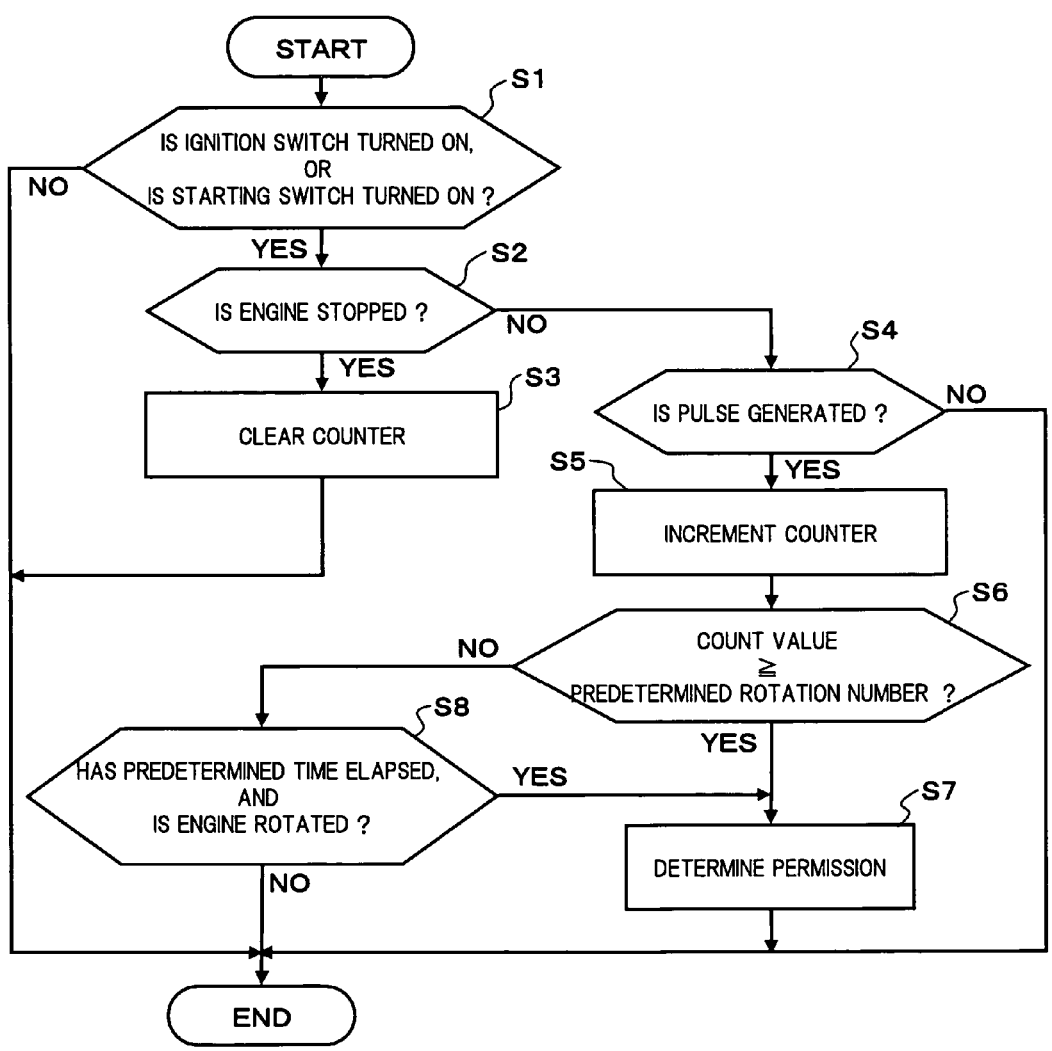
FIG. 4 is a flowchart showing a first embodiment of control of the variable valve actuation mechanism.

As shown in the flowchart of FIG. 4, engine control unit 30 determines whether or not variable operating angle control mechanism 10 is permitted to be driven, and engine control unit 30 controls variable operating angle control mechanism 10 based on the result of determination.

In the flowchart of FIG. 4, in Step S1, engine control unit 30 determines whether or not ignition switch 36 or starting switch 37 is in an ON state.

When ignition switch 36 or starting switch 37 is in the ON state, the flow goes to Step S2.

In Step S2, whether or not the engine is in a stopped state is determined based on whether or not output of the pulse signal is stopped from crank angle sensor 33 for a predetermined time or more.

In Step S2, when engine control unit 30 determines that the engine is in the stopped state, the flow goes to Step S3, and engine control unit 30 clears a counter which counts the number of outputs from crank angle sensor 33.

On the other hand, when engine control unit 30 determines at Step S2 that the engine is not in the stopped state, the flow goes to Step S4.

In Step S4, engine control unit 30 determines whether or not the pulse signal is output from crank angle sensor 33.

When engine control unit 30 determines that the pulse signal is output from crank angle sensor 33, the flow goes to Step S5, and engine control unit 30 increments a counter value.

In Step S6, engine control unit 30 determines whether or not the counter value has reached a predetermined number of times.

Figure 5:
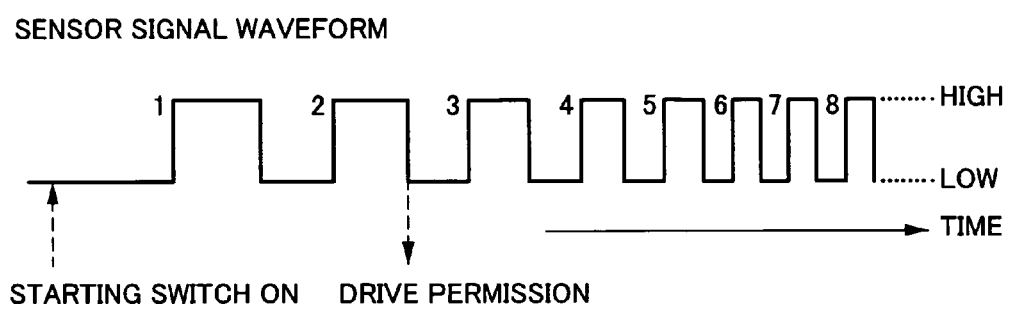
FIG. 5 is a timing chart showing control characteristics of the variable valve actuation mechanism in the first embodiment.

When the counter value has reached the predetermined number of times, engine control unit 30 determines that the engine rotation has started according to the starting operation, and the flow goes to Step S7. Engine control unit 30 permits variable operating angle control mechanism 10 to do drive control, i.e., permits motor 17 to do the rotational control of control shaft 13 (see FIG. 5).

When the engine is not rotated, even if motor 17 is driven, variable operating angle control mechanism 10 is not moved due to the large friction and accordingly, the large amount of current must pass through motor 17.

However, as described above, when engine control unit 30 makes the determination of the start of the engine rotation to drive motor 17, the large amount of current does not pass through electric actuator, i.e., motor 17 and therefore, motor 17 and its drive circuit which can withstand a large amount of current are not required since variable operating angle control mechanism 10 is operated in response to the driving of the motor 17.

Since engine control unit 30 makes the determination of the start of the engine rotation to permit the drive of motor 17, the change in operating angle and lift of intake valve 2 performed by variable operating angle control mechanism 10 is not largely delayed to the engine starting operation, the operating angle and lift can be immediately changed to optimum values in the engine starting state, and the high starting property of the engine can be maintained.

Further, since engine control unit 30 makes the determination of the start of the engine rotation based on the pulse signal of crank angle sensor 33, the determination of the start of the engine rotation can be immediately made with high accuracy.

Step S7 is a process of permitting motor 17 to be driven from the engine rotation state. In the case where the determinations of other permission conditions such as the battery voltage and failure diagnosis results are made, motor 17 is driven when all the permission conditions including other permission conditions are satisfied.

On the other hand, in Step S6, when engine control unit 30 determines that the counter value does not reach the predetermined number of times, the flow goes to Step S8.

In Step S8, engine control unit 30 determines whether or not the engine is rotated while at least the predetermined time has elapsed since starting switch 37 is turned on.

Whether or not the engine is rotated is determined based on whether or not the pulse signal of crank angle sensor 33 is constantly output for the predetermined time or more.

When the engine is rotated while at least the predetermined time has elapsed since starting switch 37 is turned on, the flow goes to Step S7, and engine control unit 30 permits the drive of motor 17 even if the counter value does not reach the predetermined number of times.

This allows the undue delay of the drive permission of motor 17, caused by the counter, to be avoided.

In the configuration of the above embodiment, the determination of the start of the engine rotation is made based on the pulse signal of crank angle sensor 33. However, because the engine has the characteristics in which a starter is driven to lower the battery voltage by turning on starting switch 37 and then the battery voltage is recovered by starting the engine rotation, it is also possible that the determination of the start of the engine rotation is made by monitoring a change in the battery voltage.

Figure 6:
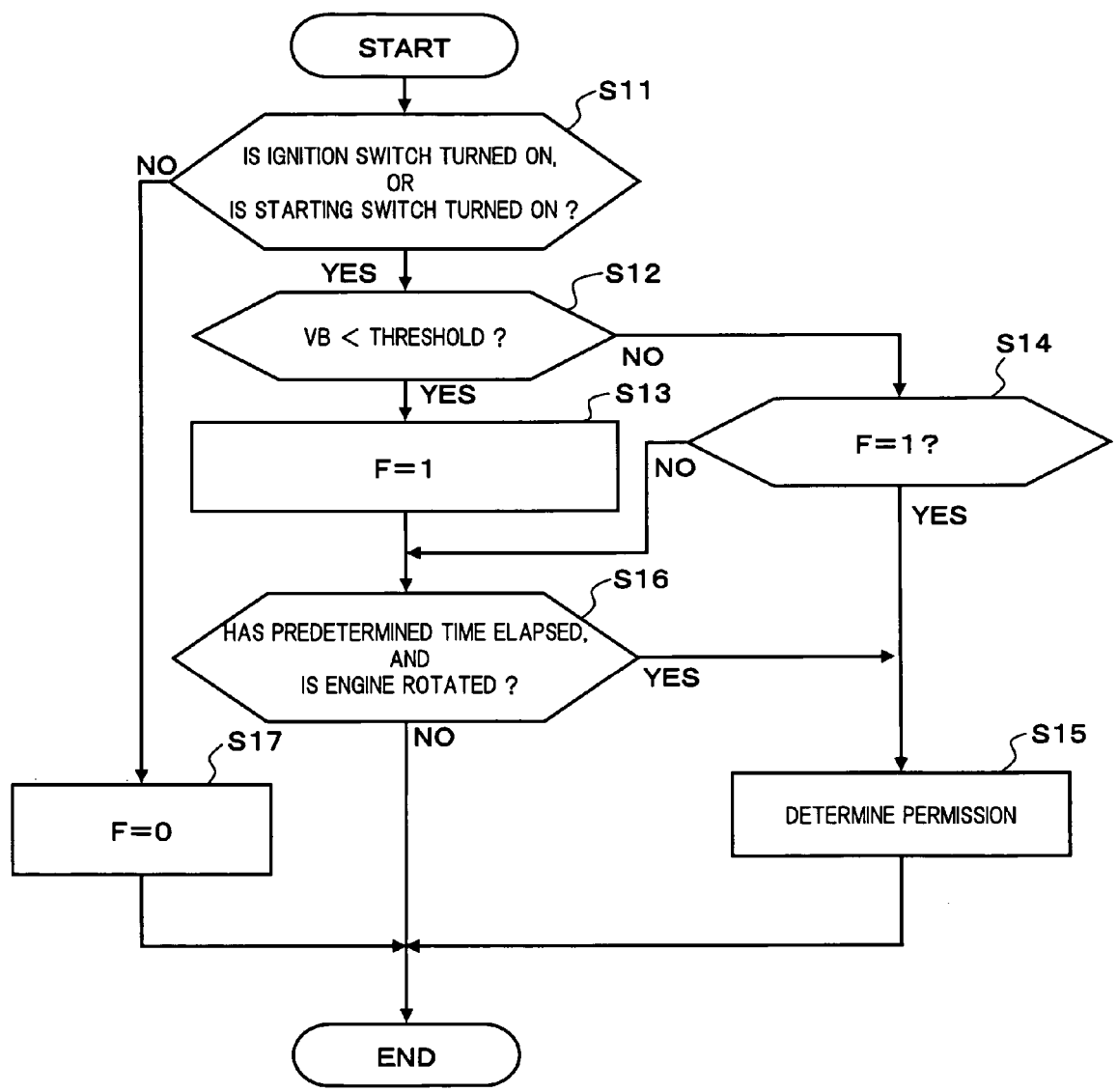
FIG. 6 is a flowchart showing a second embodiment of control of the variable valve actuation mechanism.

FIG. 6 is a flowchart showing an embodiment in which the determination of the start of the engine rotation is made based on the battery voltage to permit the drive of motor 17.

In Step S11, engine control unit 30 determines whether or not ignition switch 36 or starting switch 37 is in the ON state. When the ignition switch 36 or starting switch 37 is in the ON state, the flow goes to Step S12.

In Step S12, engine control unit 30 determines whether or not a battery voltage VB is lower than a threshold. When the battery voltage VB is lower than the threshold, the flow goes to Step S13, and flag F is set at 1.

The threshold is preferably set based on the battery voltage VB before the starting operation of the engine. When the determination of NO is made in Step S11, flag F is set at 0 in Step S17.

In Step S12, when engine control unit 30 determines that the battery voltage VB is equal to or higher than the threshold, the flow goes to Step S14. In Step S14, engine control unit 30 determines whether or not flag F is 1.

That flag F is 1 means that the battery voltage VB is lowered below the threshold once and then the battery voltage VB is increased to the threshold or higher.

On the other hand, that flag F is 0 means that the battery voltage VB is held to be not lower than the threshold after the beginning of the starting operation of the engine.

As described above, in the normal engine starting, the engine exhibits the characteristics in which the battery voltage VB is restored in association with the engine rotation after the battery voltage VB is lowered in response to the start of the starter drive. Therefore, in the case where the battery voltage VB is increased to the threshold or higher after the battery voltage VB is lowered below the threshold once, engine control unit 30 determines that it is the timing for the start of the engine rotation.

Figure 7:
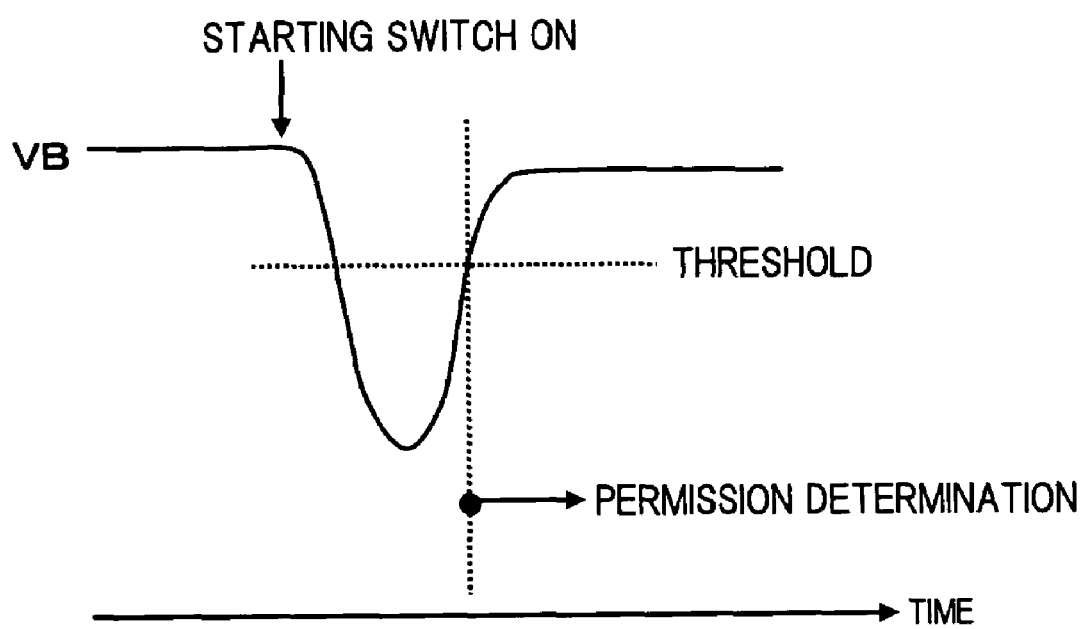
FIG. 7 is a timing chart showing control characteristics of the variable valve actuation mechanism in the second embodiment.

That is, when engine control unit 30 determines that flag F is 1 in Step S14, engine control unit 30 determines that it is the timing for the start of the engine rotation, and the flow goes to Step S15. In Step S15, engine control unit 30 permits the drive control of variable operating angle control mechanism 10, i.e., permits rotation of control shaft 13 by motor 17 (see FIG. 7).

After flag F is set at 1 in Step S13, and when engine control unit 30 determines that flag F is 0 in Step S14, the flow goes to Step S16. In Step S16, engine control unit 30 determines whether or not the engine is rotated while at least the predetermined time has elapsed since starting switch 37 is turned on.

Whether or not the engine is rotated is determined based on whether the pulse signal of crank angle sensor 33 is constantly output for at least the predetermined time.

When the engine is rotated while at least the predetermined time has elapsed since starting switch 37 is turned on, the flow goes to Step S15 without waiting for the permission determination based on the battery voltage VB, and engine control unit 30 permits the drive control of variable operating angle control mechanism 10 (motor 17).

Accordingly, even if the drive permission determination is not properly made based on the battery voltage VB, the engine can be prevented from being left without the drive permission being made.

It is possible to combine the process of making the determination of the start of the engine rotation based on the pulse signal of crank angle sensor 33 and the process of making the determination of the start of the engine rotation based on the battery voltage VB.

Specifically, for example, it is possible to permit the drive control of variable operating angle control mechanism 10 (motor 17) at the faster timing of any one of the determination of the start of the engine rotation based on the pulse signal of the crank angle sensor 33 and the determination of the start of the engine rotation based on the battery voltage VB The variable valve actuation mechanism is not limited to variable operating angle control mechanism 10 having the above configuration, and the engine valve in which the operating characteristics is varied by the variable valve actuation mechanism is not limited to the intake valve.

In FIG. 4 or 6, the processes in Step S8 and Step S16 can be omitted.

The entire contents of Japanese Patent Application NO. 2005-034780, filed Feb. 10, 2005 are incorporated herein by reference.

While only selected embodiments have been chosen to describe and illustrate the present invention, it will be apparent to those skilled in the art from this disclosure that various change and modification can be made herein without departing from the scope of the invention as defined in the appended claims.

Furthermore, the foregoing description of the embodiments according to the present invention is provided for illustration only, and not for the purpose of limiting the invention as defined by the appended claims and their equivalents.

I claim:

1. The apparatus for controlling a variable valve actuation mechanism which varies operating characteristics of an engine valve provided for an engine, the apparatus comprising:

a rotation sensor that generates a pulse signal in synchronization with an engine rotation;

a counter that counts a number of said pulse signal generated from a stopped state of said engine;

a first control-starting unit that starts driving control of said variable valve actuation mechanism when a value of said counter reaches a predetermined value; and a second control-starting unit that starts driving control of said variable valve actuation mechanism, in priority to said first control-starting unit, when an elapsed time reaches a predetermined time from beginning of a starting operation of said engine.

2. An apparatus for controlling a variable valve actuation mechanism which varies operating characteristics of an engine valve provided for an engine, the apparatus comprising:
- a rotation sensor that generates a pulse signal in synchronization with an engine rotation;
- a counter that counts a number of said pulse signal generated from a stopped state of said engine;
- a first control-starting unit that starts driving control of said variable valve actuation mechanism when a value of said counter reaches a predetermined value; and
- a second control-starting unit that starts driving control of said variable valve actuation mechanism, in priority to said first control-starting unit, when said engine is rotated while the elapsed time reaches the predetermined time from beginning of a starting operation of said engine.

3. A method for controlling a variable valve actuation mechanism, which varies operating characteristics of an engine valve provided for an engine, the method comprising the steps of:
- generating pulse signals in synchronization with an engine rotation;
- counting a number of generated pulse signals;
- starting driving control of said variable valve actuation mechanism when the number of pulse signals generated from a stopped state of said engine reaches a threshold;
- measuring an elapsed time from beginning of a starting operation of said engine; and
- starting the driving control of said variable valve actuation mechanism when the elapsed time reaches a predetermined time and the driving control of said variable valve actuation mechanism is not started.

4. A method for controlling a variable valve actuation mechanism, which varies operating characteristics of an engine valve provided for an engine, the method comprising the steps of:
- generating pulse signals in synchronization with an engine rotation;
- counting a number of generated pulse signals;
- starting driving control of said variable valve actuation mechanism when the number of pulse signals generated from a stopped state of said engine reaches a threshold;
- measuring an elapsed time from beginning of a starting operation of said engine; and
- starting the driving control of said variable valve actuation mechanism when the elapsed time reaches a predetermined time while said engine is rotating and the driving control of said variable valve actuation mechanism is not started.

5. A method for controlling a variable valve actuation mechanism, which is adapted for being mounted on an engine having an engine starter motor powered by a battery, to vary operating characteristics of an engine valve, the method comprising the steps of:
- detecting a battery voltage of the battery;
- comparing said battery voltage with a threshold;
- starting driving control of said variable valve actuation mechanism when said battery voltage exceeds said threshold after said battery voltage is once lowered below said threshold;
- measuring an elapsed time from beginning of starting of said engine; and
- starting driving control of said variable valve actuation mechanism when the elapsed time reaches a predetermined time and the driving control of said variable valve actuation mechanism is not started.

6. An apparatus for controlling a variable valve actuation mechanism which is adapted for being mounted on an engine having an engine starter motor powered by a battery, to vary operating characteristics of an engine valve, the apparatus comprising:
- a rotation sensor that generates pulse signals in synchronization with an engine rotation;
- a counter that counts a number of said pulse signals having generated from a stopped state of said engine;
- a first determining unit that determines whether or not a starting of driving control of said variable valve actuation mechanism is permitted, when a value of the number counted by said counter reaches a predetermined value;
- a voltage detector that detects a battery voltage;
- a comparator that compares said battery voltage with a threshold;
- a second determining unit that determines whether or not a starting of driving control of said variable valve actuation mechanism is permitted, when said battery voltage exceeds said threshold after said battery voltage is once lowered below said threshold;
- a first control-starting unit that starts driving control of said variable valve actuation mechanism at an earlier timing of any one of the permission determination by said first determining unit and the permission determination by said second determining unit; and
- a second control-starting unit that starts driving control of said variable valve actuation mechanism, in priority to said first control-starting unit, when an elapsed time reaches a predetermined time from beginning of a starting operation of said engine.

7. An apparatus for controlling a variable valve actuation mechanism which is adapted for being mounted on an engine having an engine starter motor powered by a battery, to vary operation characteristics of an engine valve, the apparatus comprising:
- a rotation sensor that generates pulse signals in synchronization with an engine rotation;
- a counter that counts a number of said pulse signals having generated from a stopped state of said engine;
- a first determining unit that determines whether or not a starting of driving control of said variable valve actuation mechanism is permitted, when a value of the number counted by said counter reaches a predetermined value;
- a voltage detector that detects a battery voltage;
- a comparator that compares said battery voltage with a threshold;
- a second determining unit that determines whether or not a starting of driving control of said variable valve actuation mechanism is permitted, when said battery voltage exceeds said threshold after said battery voltage is once lowered below said threshold;
- a first control-starting unit that starts driving control of said variable valve actuation mechanism at an earlier timing of any one of the permission determination by said first determining unit and the permission determination by said second determining unit; and
- a second control-starting unit that starts driving control of said variable valve actuation mechanism, in priority to said first control-starting unit, when the elapsed time reaches the predetermined time from beginning of a starting operation of said engine while said engine is rotating.

8. A method for controlling a variable valve actuation mechanism which is adapted for being mounted on an engine having an engine starter motor powered by a battery, to vary operating characteristics of an engine valve, the method comprising the steps of:
: generating a pulse signal in synchronization with an engine rotation;
: counting a number of generated pulse signals;
: outputting a first permission signal indicating that starting of driving control of said variable valve actuation mechanism is permitted, when the number of pulse signals generated from a stopped state of said engine reaches a pulse threshold;
: detecting a battery voltage of the battery;
: comparing said battery voltage with a voltage threshold;
: outputting a second permission signal indicating that starting of driving control of said variable valve actuation mechanism is permitted, when said battery voltage exceeds said voltage threshold after said battery voltage is once lowered below said voltage threshold;
: starting driving control of said variable valve actuation mechanism at an earlier timing of any one of the first permission signal and the second permission signal; and
: measuring an elapsed time from beginning of starting operation of said engine; and
: starting driving control of said variable valve actuation mechanism when the elapsed time reaches a predetermined time and the driving control of said variable valve actuation mechanism is not started.

9. A method for controlling a variable valve actuation mechanism which is adapted for being mounted on an engine having an engine starter motor powered by a battery, to vary operating characteristics of an engine valve, the method comprising the steps of:
: generating a pulse signal in synchronization with an engine rotation;
: counting a number of generated pulse signals;
: outputting a first permission signal indicating that starting of driving control of said variable valve actuation mechanism is permitted, when the number of pulse signals generated from a stopped state of said engine reaches a pulse threshold;
: detecting a battery voltage of the battery;
: comparing said battery voltage with a voltage threshold;
: outputting a second permission signal indicating that starting of driving control of said variable valve actuation mechanism is permitted, when said battery voltage exceeds said voltage threshold after said battery voltage is once lowered below said voltage threshold;
: starting driving of said variable valve actuation mechanism at an earlier timing of any one of the first permission signal and the second permission signal;
: measuring an elapsed time from beginning of a starting operation of said engine; and
: starting driving control of said variable valve actuation mechanism when the elapsed time reaches a predetermined time while said engine is rotating and the driving control of said variable valve actuation mechanism is not started.

10. A method for controlling a variable valve actuation mechanism, which is adapted for being mounted on an engine having an engine starter motor powered by a battery, to vary operating characteristics of an engine valve, the method comprising the steps of:
: detecting a battery voltage of the battery;
: comparing said battery voltage with a threshold;
: starting driving control of said variable valve actuation mechanism when said battery voltage exceeds said threshold after said battery voltage is once lowered below said voltage threshold;
: measuring an elapsed time from beginning of a starting operation of said engine; and
: starting driving control of said variable valve actuation mechanism when the elapsed time reaches a predetermined time while said engine is rotating and the driving control of said variable valve actuation mechanism is not started.

11. An apparatus for controlling a variable valve actuation mechanism which is adapted for being mounted on an engine having an engine starter motor powered by a battery, to vary operating characteristics of an engine valve, the apparatus comprising:
: a voltage detector that detects a battery voltage;
: a comparator that compares said battery voltage with a threshold;
: a first control-starting unit that starts driving control of said variable valve actuation mechanism when said battery voltage exceeds said threshold after said battery voltage is once lowered below said threshold; and
: a second control-starting unit that starts driving control of said variable valve actuation mechanism, in priority to said first control starting unit, when an elapsed time reaches a predetermined time from beginning of a starting operation of said engine.

12. An apparatus for controlling a variable valve actuation mechanism which is adapted for being mounted on an engine having an engine starter motor powered by a battery, to vary operating characteristics of an engine valve, the apparatus comprising:
: a voltage detector that detects a battery voltage;
: a comparator that compares said battery voltage with a threshold;
: a first control-starting unit that starts driving control of said variable valve actuation mechanism when said battery voltage exceeds said threshold after said battery voltage is once lowered below said threshold; and
: a second control-starting unit that starts driving control of said variable valve actuation mechanism, in priority to said first control starting unit, when the elapsed time reaches the predetermined time from beginning of a starting operation of said engine while said engine is rotating.

* * * * *

UNITED STATES PATENT AND TRADEMARK OFFICE
CERTIFICATE OF CORRECTION

PATENT NO.        : 7,628,127 B2                                      Page 1 of 1
APPLICATION NO. : 11/349912
DATED             : December 8, 2009
INVENTOR(S)       : Naoki Okamoto It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 15 days.

Signed and Sealed this

Twenty-first Day of December, 2010

David J. Kappos
*Director of the United States Patent and Trademark Office*